April 22, 1958    R. H. BENNETT    2,831,393
SPECTACLE MOUNTING

Filed Oct. 10, 1951    2 Sheets-Sheet 1

INVENTOR.
RAYMOND H. BENNETT
BY
ATTORNEY

April 22, 1958   R. H. BENNETT   2,831,393
SPECTACLE MOUNTING

Filed Oct. 10, 1951   2 Sheets-Sheet 2

INVENTOR.
RAYMOND H. BENNETT
BY
ATTORNEY

United States Patent Office 2,831,393
Patented Apr. 22, 1958

2,831,393

SPECTACLE MOUNTING

Raymond H. Bennett, Rochester, N. Y., assignor to Art-Craft Optical Company, Rochester, N. Y., a corporation of New York Application October 10, 1951, Serial No. 250,652

5 Claims. (Cl. 88—41)

The present invention relates to spectacle frames and more particularly to spectacle frames of the so-called semi-rimless type.

Spectacle frames are now made in a wide variety of designs and colors. Many persons desire spectacles of different colors and/or designs to fit with different articles of dress or different apparel or to suit different occasions or purposes. Heretofore, therefore, manufacturers of spectacle frames, opticians, and optometrists have had to maintain large inventories of various sizes and shapes of spectacle frames in order to satisfy the requirements and tastes of the public. Moreover, since conventional spectacle frames are made so that the lenses are permanently fixed therein, any individual spectacle user, who has desired to have spectacle frames of different colors and/or designs, has had to buy the corresponding number of complete spectacles, lenses included. This is expensive because the cost of the lenses constitutes a large part of the cost of any spectacle.

One object of the present invention is to provide spectacle frames from which the lenses may readily be removed and replaced.

Another object of the invention is to provide spectacle frames from which the lenses may readily be removed and replaced even by an individual wearer.

A coordinate object of the invention is to provide a spectacle construction which will permit of shifting lenses readily from a frame of one color or design to a frame of a different color or design so that a person can use a single pair of lenses with any number of differently colored or differently shaped frames, thus making it possible for a customer to purchase a single pair of lenses and use those lenses with any different number of frames.

A further object of the invention is to provide a spectacle construction of the type described in which the lenses themselves are removably mounted in holders which are removably mountable in the frames, so that not only may a single pair of lenses be transferred from frame to frame, but the lenses themselves may be changed, as, for instance, when obsoleted, without obsoleting the frames themselves.

Another object of the invention is to provide a lens holder for use with spectacle frames of the type described which can readily be opened to slip out or slip a lens therein.

Still another object of the invention is to provide a spectacle frame of the type described of which the main portion may be made of plastic while the lens holder itself is made of metal, and in which the lens holder may so be mounted removably in the plastic part of the frame as to hold the lens firmly and securely in correct optical position.

Still further objects of the invention are to provide spectacle frames of the semi-rimless type which are pleasing in appearance and durable in construction.

Other objects of the invention will be apparent hereinafter from the specification and from the recital of the appended claims.

Figure 1:
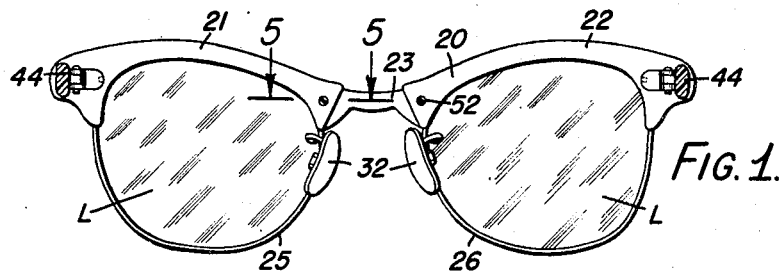
Fig. 1 is a rear elevation, with the temples broken away, of a spectacle frame made according to one embodiment of this invention.
Figure 2:
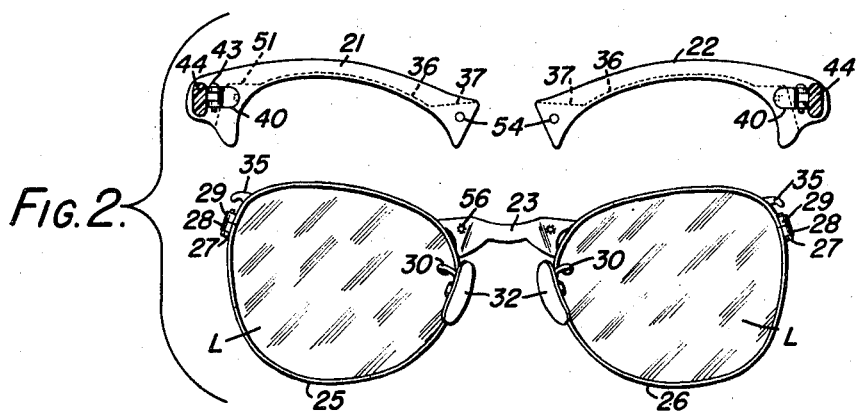
Fig. 2 is an exploded view showing the semi-rims of this frame separated from the lens holders, the lens holders and bridge in this embodiment of the invention being both made of metal.

Referring now to the drawings by numerals of reference and first to the embodiment of the invention shown in Figs. 1 to 5 inclusive, 20 denotes generally the spectacle mounting. This mounting includes two semi-rims 21 and 22, a bridge 23, and two lens holders or eye-wires 25 and 26.

Figure 6:
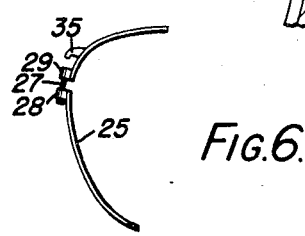
Fig. 6 is a fragmentary view of one of the lens-holders or eye-wires, showing the lens-holder or eye-wire opened to permit slipping a lens in or out of the holder or eye-ring.

The eye-wires hold the lenses L of the spectacle. Each is made of a suitable metal, for instance gold, and is shaped to encircle and enclose one of the lenses L. Each eyewire is split as clearly shown in Fig. 6 so that it may be opened up to permit insertion into it or removal from it of a lens. After each lens has been placed in its eye-wire, it is secured therein by threading upon a screw 27 which passes through a tube 28 and threads into a tube 29. There are a tube 28 and a tube 29 soldered or otherwise secured to each eyewire at opposite sides of the split in each eyewire; and the tubes have plane opposed faces that abut against one another. In this embodiment of the invention the two eyewires are soldered or otherwise secured to the bridge 23, which is here made of metal, so that, in effect eyewires and bridge are integral with one another.

Each of the eyewires has an arm 30 soldered or otherwise secured to it which carries a conventional nasal pad 32. Each eyewire is also formed with a hook 35 by means of which it may be detachably secured at one side to one of the semi-rims 21 or 22. Each semi-rim is grooved in its bottom face, as denoted at 36, to receive and to conceal the upper reach of the associated eyewire. Each semi-rim is also grooved along its nasal edge, as denoted at 37, to receive and to conceal the adjacent portion of the bridge 23.

Figures 3, 4:
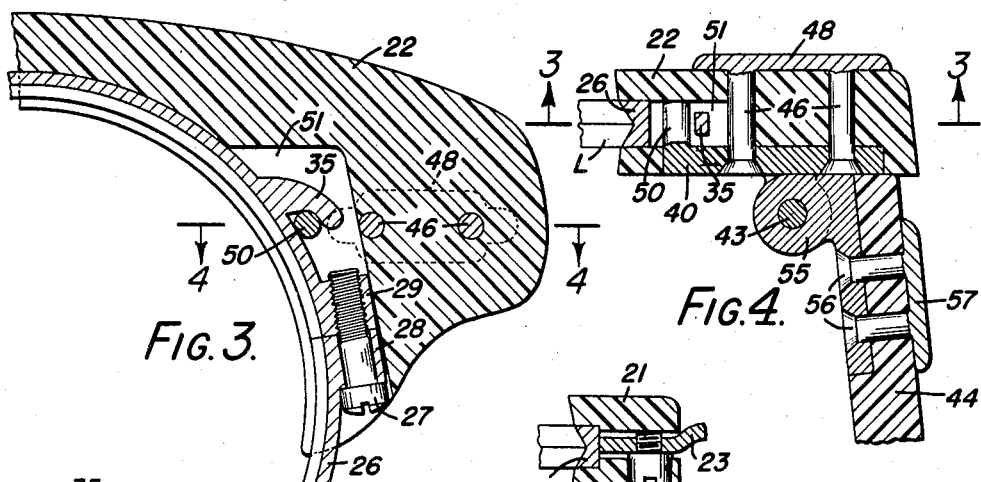
Fig. 3 is a fragmentary section on an enlarged scale showing a detail of the structure of the lens holders and the means for connecting the lens holders with the semi-rims, the section being taken on the line 3—3 of Fig. 4 looking in the direction of the arrows.
Fig. 4 is a section on the line 4—4 of Fig. 3 looking in the direction of the arrows.
Figure 5:
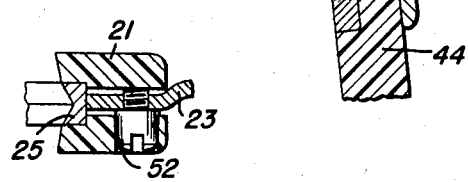
Fig. 5 is a fragmentary section on an enlarged scale on the line 5—5 of Fig. 1 looking in the direction of the arrows.
Figure 7:
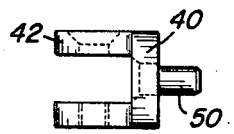
Fig. 7 is a side view of one of the front hinge members of the spectacle frame.
Figure 8:
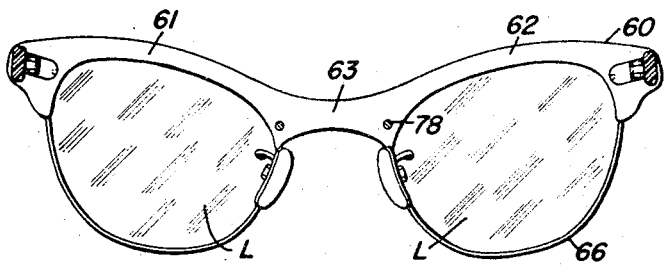
Fig. 8 is a rear elevation, similar to Fig. 1 of a spectacle mounting made according to a further embodiment of the invention.
Figure 9:
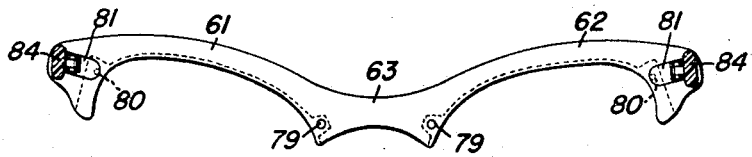
Fig. 9 is a rear elevation of the frame portion of the spectacle mounting, the temples being broken away.

Each semi-rim is provided on its back face at its outside, that is, adjacent its temple edge, with a groove (see Fig. 4) which is adapted to receive a hinge-plate 40. The hinge plate is formed on its rear face with two parallel rearwardly projecting ears 42 (Fig. 7) which are adapted to hold the hinge pin 43 (Fig. 4) by means of which the frame is hingedly connected with the associated temple or bow 44 of the spectacle. Each hinge-plate 40 is secured to its semi-rim by rivets 46 that are integral with a decorative shield 48. The shield 48 is located against the front face of the semi-rim. The rivets 46 pass through the plastic semi-rim 25 or 26, as the case may be, and are anchored, as shown in Fig. 4, in the hinge-plate 40 so that none of the strains on the hinge are transmitted to the plastic of the semi-rim. Each hinge-plate 40 has a lug 50 (Figs. 4 and 7) projecting forwardly therefrom into a recess 51 (Figs. 3 and 4) formed in the semi-rim. The hook 35 of each eyewire 25 or 26 is adapted to engage over the associated lug or pin 50 to secure the eyewire at one side in its associated semi-rim. Each eyewire 25, 26 is secured at its opposite or nasal side to the associated semi-rim 21 or 22 by a screw 52 (Figs. 1 and 5) which is mounted in a recess 54 (Fig. 2) in the back of the semi-rim and threads into a hole 56 (Fig. 2) in the bridge 23.

In assembling the spectacle, the lenses L are inserted in the two eyewires 25 and 26. Then the screws 27 are threaded up to secure the lenses in the eyewires. Then one of the semi-rims, for instance the semi-rim 21, is rocked so that the pin 50 of its hinge-plate 40 is engaged under the hook 35 of the associated eyewire, and the semi-rim is rocked down to seat the upper reach of the eyewire in the groove 36 in the semi-rim and to seat the adjacent portion of the bridge 23 in the groove 37. Then the eyewire is secured to the semi-rim by passing screw 52 (Fig. 5) through hole 54 in the semi-rim and threading the screw into hole 56 in the bridge 23. In similar manner, the other semi-rim is secured to the other eyewire at the opposite end of the bridge 23.

Each temple 44 is hingedly connected with the frame 20 by a hinge-piece 55 that is seated in a recess on the inside of the temple, see Fig. 4, and that is provided with a hole to receive the associated hinge-pin 43. The hinge-pieces 55 are secured to their respective temples 44 by rivets 56 that are formed integral with decorative shields 57 that are secured against the outside surfaces of the temples.

From the above description it is seen that it is not necessary for the manufacturer, or dealer to stock a whole series of different sizes and shapes of full plastic or full metal frames, but that with the present invention eyewires of suitable shapes and sizes may be stocked, and when an order is received for a particular style of frame, the semi-rims of the desired style can readily be mounted upon the eyewires, and lenses of the desired prescription can readily be inserted, as required, into the eyewires. Furthermore, any user of eyeglasses can with mountings constructed according to the present invention readily change lenses from one spectacle mounting to another simply with a screwdriver. All that is required is to remove the screws 52 which secure the semi-rims 21 and 22 to the eyewires, and to rock the semi-rims upwardly to detach the hooks 35 from the lugs 50 of the hinge-plates 40, and then, to attach the lens mounting 25—26—23 including the lenses to another set of semi-rims. All that a spectacle wearer has to do then is to buy a single pair of lenses and a single mounting 25—26—23 and as many varieties of semi-rims as he desires and the wearer can readily have in a few seconds at any time a spectacle mounting of any color and shape he chooses. Moreover, when the wearer's eyes require new lenses, the wearer does not have to buy a whole new spectacle, all that the wearer needs purchase is a new pair of lenses; the wearer or his optician can readily open the eyewires with a screwdriver, take out the old lenses, slip in the new ones, tighten the eyewires again and replace them in the semi-rims. The invention, therefore, is a boon to manufacturer, dealer, and wearer.

The embodiment of the invention shown in Figs. 8 to 12 inclusive differs from the embodiment previously described in that the semi-rims are made integral with the bridge portion of the frame, and in that eyewires for the two lenses are separate from one another and are removably connected to the bridge as well as to the semi-rims. Here, both the semi-rims and bridge are preferably made of plastic, while the eyewires alone are made of metal.

In the embodiment of the invention shown in Figs. 8 to 12 inclusive, 60 denotes the frame generally. This comprises the two semi-rim portions 61 and 62 and the bridge 63 which is integral therewith. Only one, 66, of the eyewires is shown in detail in Fig. 10. The two eyewires are alike except that one is, of course, left hand, and the other right hand. Each eyewire is as in the previously described embodiment of the invention, a thin, resilient metal wire, such as gold wire. It is shaped to surround, as previously, the lens L which it is to carry and it is split to permit ready insertion into it or removal from it of a lens. It is fastened about the lens by a screw 67 which passes through the tube 68 and threads into the tube 69. The tubes 68 and 69 are soldered or otherwise secured, as in the previously described embodiment of the invention, to the eyewire. In this second embodiment of the invention each eyewire is formed with a hook 75 at one side and at its opposite side with a lug 76. The lug is adapted to fit into a recess 77 (Figs. 11 and 12) formed in the bridge portion 63 of the frame and is secured to the bridge portion by a screw 78 whose head fits into a recess 79 (Fig. 9) in the back of the bridge and whose stem threads into lug 76. The hook 75 is adapted to be engaged over a pin 80 (Fig. 9), similar to the pin 50 of Fig. 4, which is integral with the hinge plate 81 by means of which the frame is hingedly connected with the associated temple 84.

Figure 11:
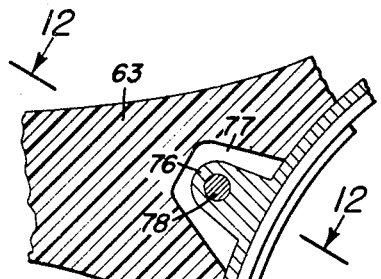
Fig. 11 is a fragmentary section on an enlarged scale showing the way in which the lens holder or eye-wire is connected to the bridge of the spectacle frame.
Figure 10:
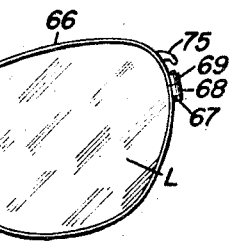
Fig. 10 is a view of one of the lens holders or eye-wires used with the frame of Figs. 8 and 9.
Figure 12:
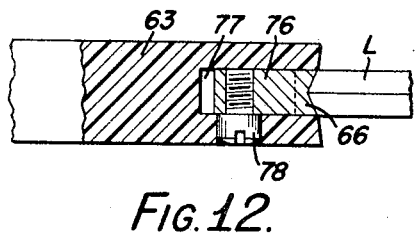
Fig. 12 is a section on the line 12—12 of Fig. 11, looking in the direction of the arrows.

To remove a lens from or mount a lens in an eyewire all that is required is to loosen or tighten, respectively, screw 67. To secure an eyewire and its lens in the frame, the hook 75 is first engaged over lug 80 (Fig. 9), and is then rocked upwardly to engage lug 76 in recess 77 (Figs. 11 and 12). Then a screw 78 is passed through a recess 79 (Fig. 9) and threaded into lug 76. To remove an eyewire and its lens from the frame, screw 78 is first removed, then hook 75 is disengaged from lug 80.

The embodiment of the invention shown in Figs. 8 to 12 inclusive possesses all of the advantages of the first-described embodiment of the invention.

While the hooks 75 have been shown as secured to the temple sides of the eyewires, it will be understood that the hooks might instead be provided on the nasal sides of the eyewires. In such case, of course, pins would be provided in the frame in the nasal sides thereof to receive the hooks. It will further be understood that instead of a lug and a hook for connecting each eyewire to the frame, two lugs might be provided; and the eyewires would then be fastened to the frame by two screws. Other modifications of the invention will be obvious to those skilled in the art.

While different embodiments of the invention have been illustrated and described, therefore, it will be understood that the invention is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:
1. A spectacle mounting comprising a pair of spaced metallic lens holders for holding the lenses of a spectacle, a metallic bridge rigidly connected to said lens holders at the nasal sides thereof, and a pair of spaced non-metallic rim members, each rim member partially encircling the associated lens holder and being grooved at its nasal end to straddle a portion of said bridge, means detachably securing the nasal end of each rim member to said bridge, a metallic hinge-member secured to the temporal end of each rim member to hingedly connect a temple thereto, and means for detachably connecting the temporal side of each lens holder to the corresponding hinge member comprising a hook on one of these two parts and a pin on the other part which is engaged by said hook.

2. A spectacle mounting comprising a pair of spaced metallic lens holders for holding the lenses of a spectacle, a metallic bridge rigidly connected to said lens holders at the nasal sides thereof, and a pair of spaced non-metallic rim members, each rim member partially encircling the associated lens holder and being grooved at its nasal end to straddle a portion of said bridge, means detachably securing the nasal end of each rim member to said bridge, a metallic hinge-member secured to the back side of each rim member at the temporal end thereof to hingedly connect a temple thereto, and means for detachably securing each lens holder to the associated rim member comprising a pin projecting forwardly from each hinge member into a recess in the associated rim member, and a hook on the temporal side of the associated lens holder which is detachably engageable with said pin.

3. A spectacle mounting comprising a pair of spaced lens holders for holding the lenses of a spectacle, each lens holder being shaped to completely encircle its lens and being made of resilient metal wire and being split transversely to permit it to be opened to insert in or to remove from it a lens, means for fastening each lens holder about its lens, a nasal pad supported on each lens holder at the nasal side thereof, a metallic bridge rigidly connected at opposite ends to the two lens holders on the nasal sides thereof, a pair of spaced non-metallic rim members, each of which is shaped to partially encircle a lens holder and to receive the adjacent part of the bridge, means for detachably securing the nasal end of each rim member to the bridge, and means for detachably securing the temporal end of each rim member to a lens holder at the temporal side of the lens holder comprising a metallic hinge member secured in the temporal side of the rim member to hingedly connect a temple thereto, a pin and a hook engaging the pin, one of the two last-named parts being secured to the hinge member and the other of the two last-named parts being secured to the lens holder at the temporal side thereof.

4. A spectacle mounting comprising a pair of spaced non-metallic rim members and a non-metallic bridge integral with and connecting said rim members, a pair of spaced lens holders for holding the lenses of a spectacle, each rim member partially encircling a lens holder, said lens holders being made of resilient metal wire and shaped to completely encircle their respective lenses, each lens holder being split at its temporal side and having a pair of outwardly-disposed, aligned, perforated lugs at the opposite sides of said split, a screw extending through said perforated lugs to detachably secure the respective ends of each lens holder in closed position, a metallic hinge member secured in the temporal end of each rim member at the rear thereof to hingedly connect a temple thereto, a pin projecting forwardly from each hinge member into a recess in the associated rim member, a hook rigidly secured to each lens holder at its temporal side in spaced relation to and above the lugs of the lens holder and adapted to engage the pin of the associated hinge member, and means for detachably securing the two lens holders at their nasal ends to said rim members.

5. A spectacle mounting comprising a pair of spaced metallic lens holders for holding the lenses of a spectacle, a metallic bridge rigidly connected to said lens holders at the nasal sides thereof, a pair of spaced, non-metallic rim members, each of which partially encircles one of said lens holders and each of which is grooved at its nasal end to straddle said bridge, means for detachably securing the nasal end of each bridge member to said bridge, each lens holder being split on its temporal side and having a pair of outwardly-disposed, aligned, perforated lugs adjacent its ends, a screw extending through the lugs of each lens holder to detachably secure the ends of the lens holder in closed position, and means for detachably securing each lens holder at its temporal side to its associated rim member comprising a metallic hinge member secured in the temporal end of each rim member at the rear thereof to hingedly connect a temple thereto, a pin projecting forwardly from said hinge member into a recess in the associated rim member, and a hook rigidly secured to each lens holder above its lugs and adapted to engage said pin.

References Cited in the file of this patent

UNITED STATES PATENTS

| | | |
|---|---|---|
| 2,284,630 | Banks | June 2, 1942 |
| 2,577,380 | Stegeman | Dec. 4, 1951 |
| 2,627,783 | Splaine | Feb. 10, 1953 |

FOREIGN PATENTS

| | | |
|---|---|---|
| 463,000 | Great Britain | Mar. 19, 1937 |